(12) United States Patent
Shim et al.

(10) Patent No.: US 7,995,502 B2
(45) Date of Patent: Aug. 9, 2011

(54) METHOD FOR ALLOCATING AN ADDRESS OF DEVICE IN WIRELESS PERSONAL AREA NETWORK (WPAN) AND WPAN DEVICE

(75) Inventors: Woo Jin Shim, Seoul (KR); Young Sik Shin, Seoul (KR); Yong Gil Park, Seongnam-si (KR); Jae Hwang Yu, Seoul (KR); Jong Tae Ihm, Seongnam-si (KR); Ho In Jeon, Seongnam-si (KR)

(73) Assignee: SK Telecom Co., Ltd. (KR)

( * ) Notice: Subject to any disclaimer, the term of this patent is extended or adjusted under 35 U.S.C. 154(b) by 216 days.

(21) Appl. No.: 12/524,447

(22) PCT Filed: Feb. 13, 2008

(86) PCT No.: PCT/KR2008/000860
§ 371 (c)(1),
(2), (4) Date: Jul. 24, 2009

(87) PCT Pub. No.: WO2008/100087
PCT Pub. Date: Aug. 21, 2008

(65) Prior Publication Data
US 2010/0110931 A1    May 6, 2010

(30) Foreign Application Priority Data

Feb. 13, 2007   (KR) .................. 10-2007-0014825

(51) Int. Cl.
*H04L 12/28*    (2006.01)
(52) U.S. Cl. ........................... 370/255; 370/401
(58) Field of Classification Search .......... None
See application file for complete search history.

(56) References Cited

U.S. PATENT DOCUMENTS

| | | | |
|---|---|---|---|
| 2005/0108432 A1* | 5/2005 | Tominaga et al. | 709/245 |
| 2006/0023643 A1* | 2/2006 | Lim | 370/254 |
| 2006/0029002 A1* | 2/2006 | Park et al. | 370/254 |
| 2006/0133373 A1* | 6/2006 | Paik et al. | 370/389 |
| 2006/0291496 A1* | 12/2006 | Zheng et al. | 370/432 |
| 2007/0036090 A1* | 2/2007 | Bhatti | 370/254 |

FOREIGN PATENT DOCUMENTS

| | | |
|---|---|---|
| KR | 10-2008-0001857 | 1/2008 |
| KR | 10-2008-0005003 | 1/2008 |
| KR | 10-2008-0005754 | 1/2008 |
| KR | 10-2008-0052031 | 6/2008 |

* cited by examiner

*Primary Examiner* — Hong Cho
(74) *Attorney, Agent, or Firm* — Baker & Hostetler LLP

(57) ABSTRACT

The present invention relates to a method of efficiently assigning addresses in a WPAN and a WPAN device. The address assignment method of the present invention is performed by a higher device. Address assignment information for determining an address to be assigned to a lower device, is managed. An address is assigned to a lower device that requests connection from the higher device based on the address assignment information. The address assignment information is updated to a address value as the address value is assigned, and the updated address assignment information is transmitted to lower devices. If an update of address assignment information is requested by the lower device that assigned an address value to a device lower thereto, the address assignment information is updated and the updated address assignment information is transmitted to lower devices.

15 Claims, 8 Drawing Sheets

[Fig. 1]
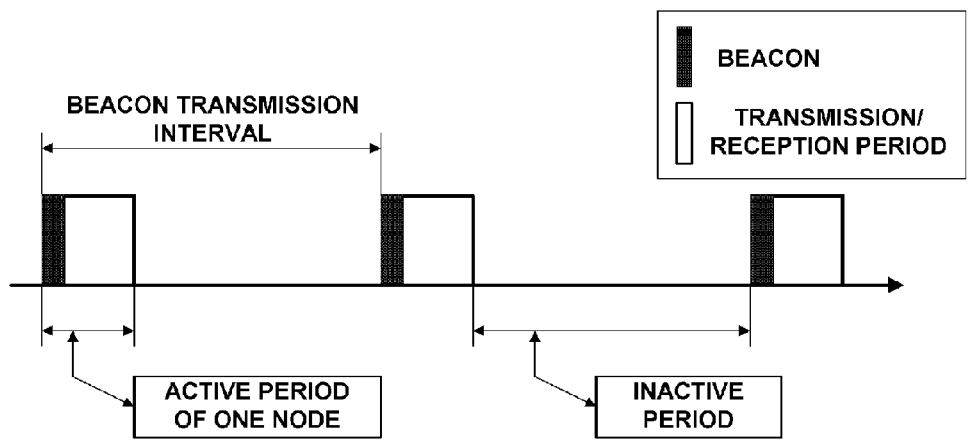
[Fig. 2]
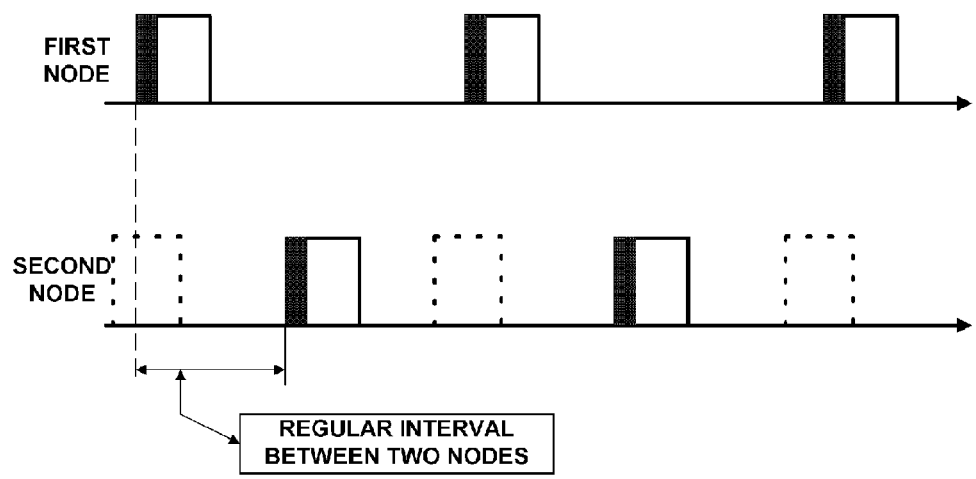
[Fig. 3]
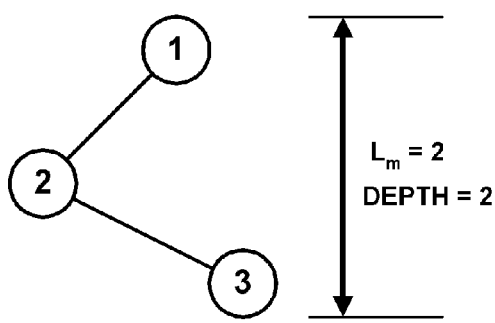
$L_m = 2$
$DEPTH = 2$
[Fig. 4]
$$Cskip(d) = \frac{1 + C_m - R_m - C_m \cdot R_m^{L_m - d - 1}}{1 - R_m}$$
[Fig. 5]
$$A_n = A_{parent} + Cskip(d) \cdot R_m + n$$

[Fig. 6]
$$C_{skip}(0) = \frac{1 + C_m - R_m - C_m \cdot R_m^{L_m - d - 1}}{1 - R_m}$$
$$= \frac{1 + 4 - 3 - 4 \cdot 3^{3-0-1}}{1 - 3} = 17$$
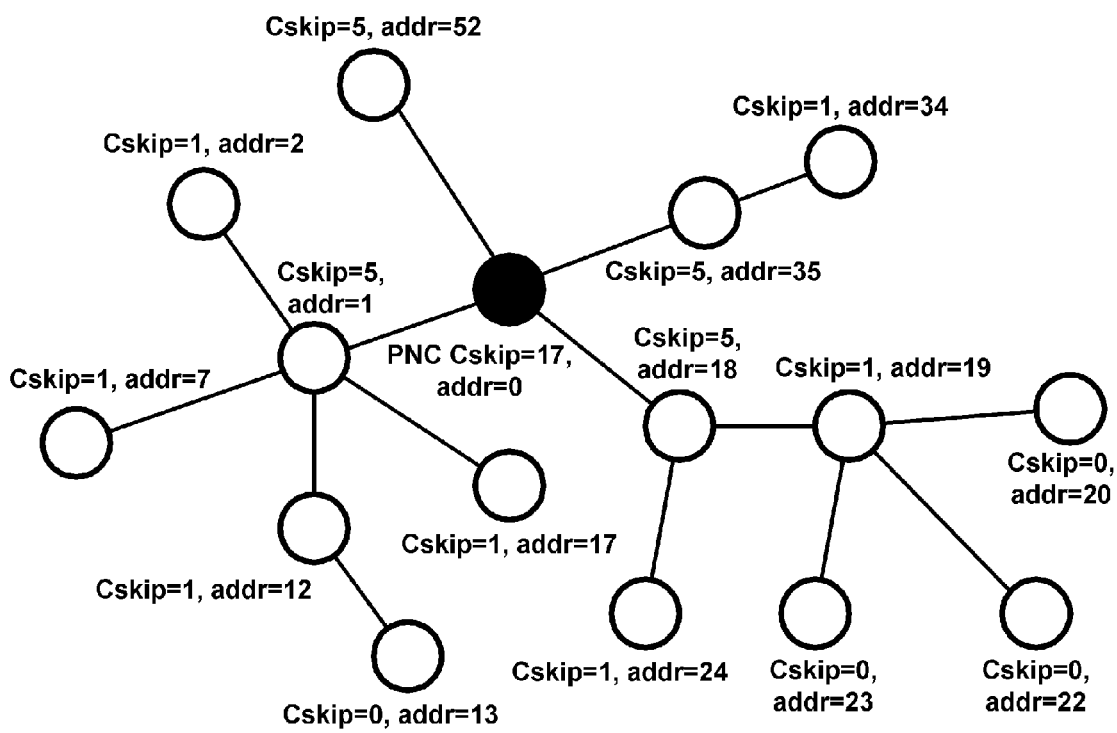
[Fig. 7]
$C_m = 4, R_m = 3, L_m = 3$

[Fig. 8]
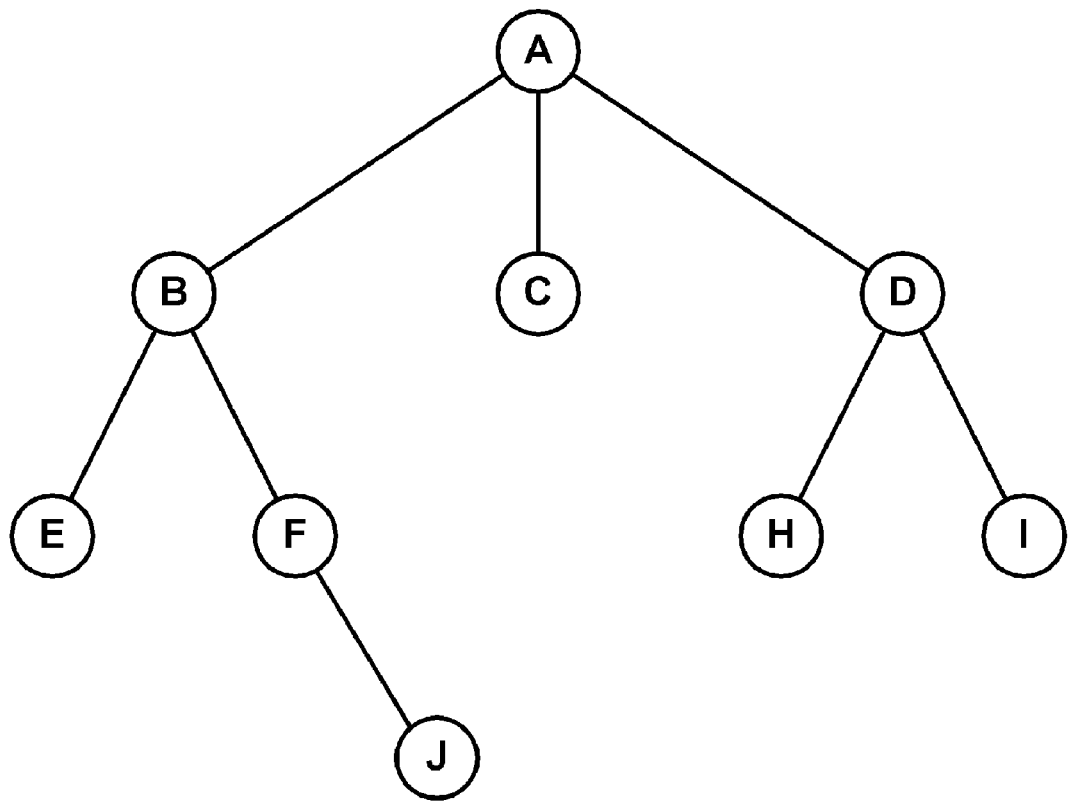
[Fig. 9]
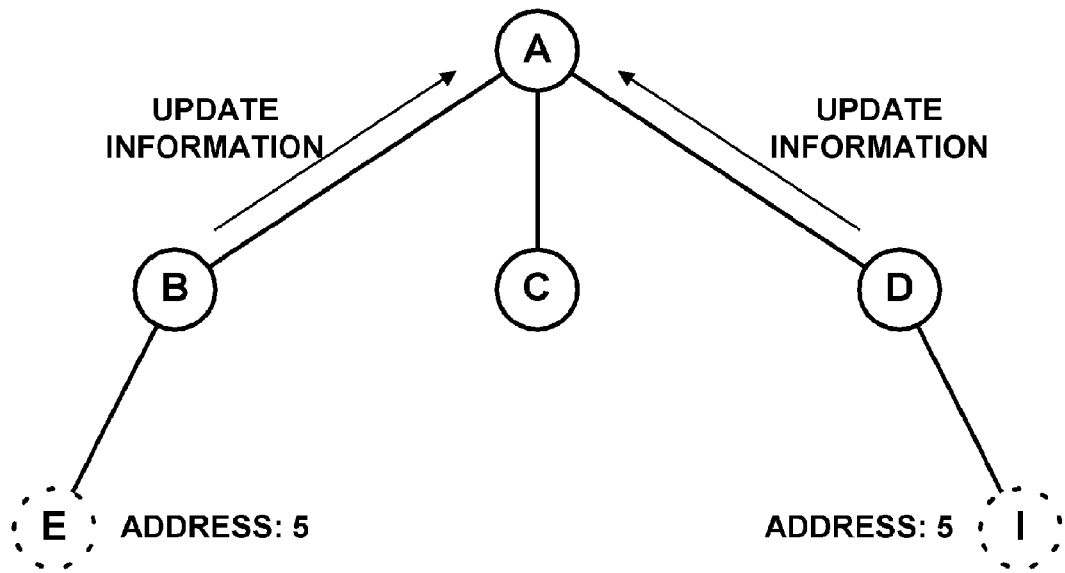

[Fig. 10]
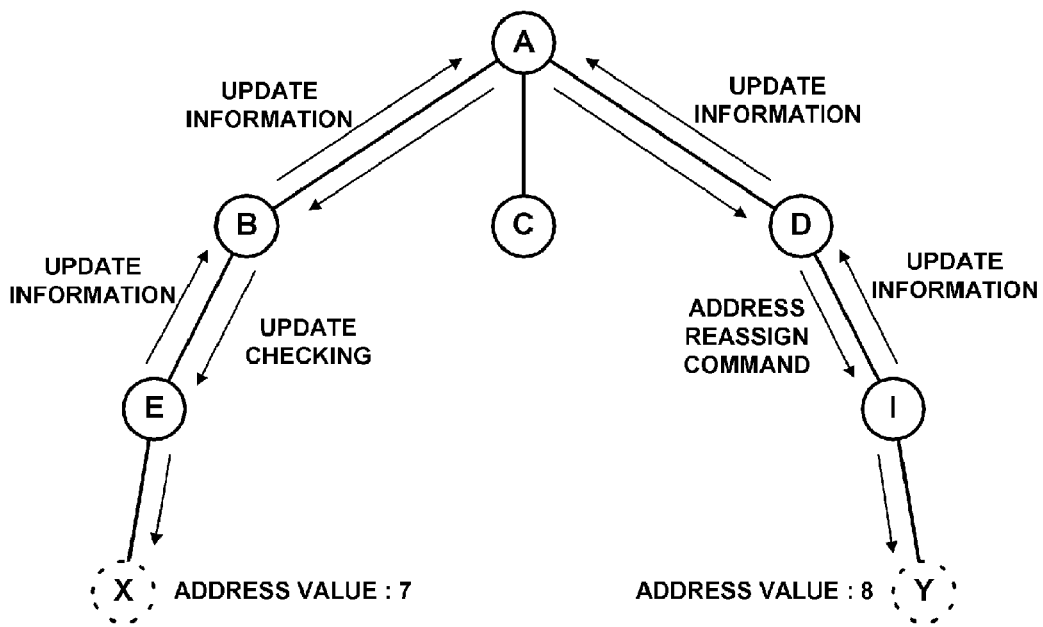
[Fig. 11]
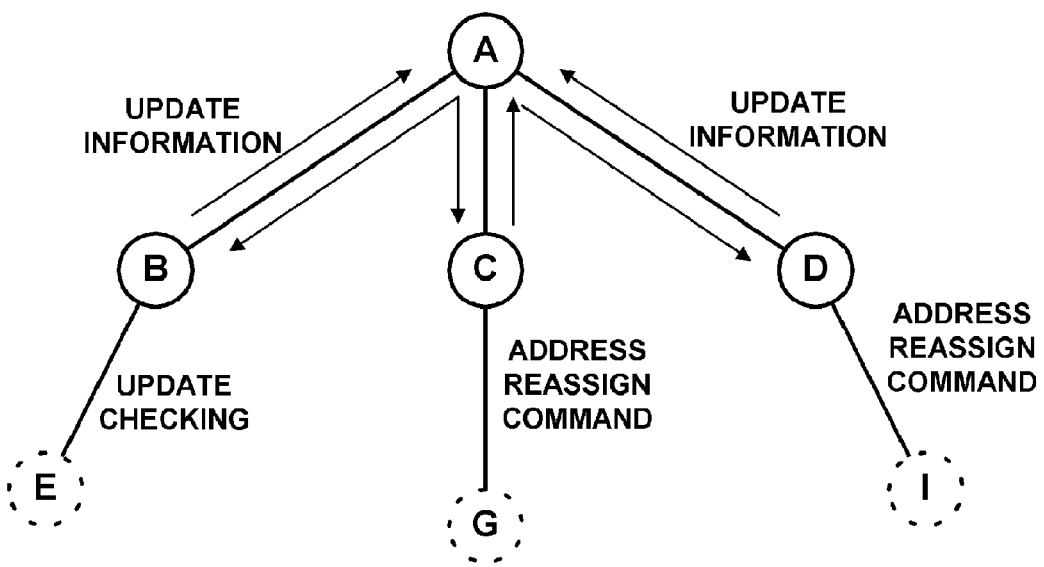

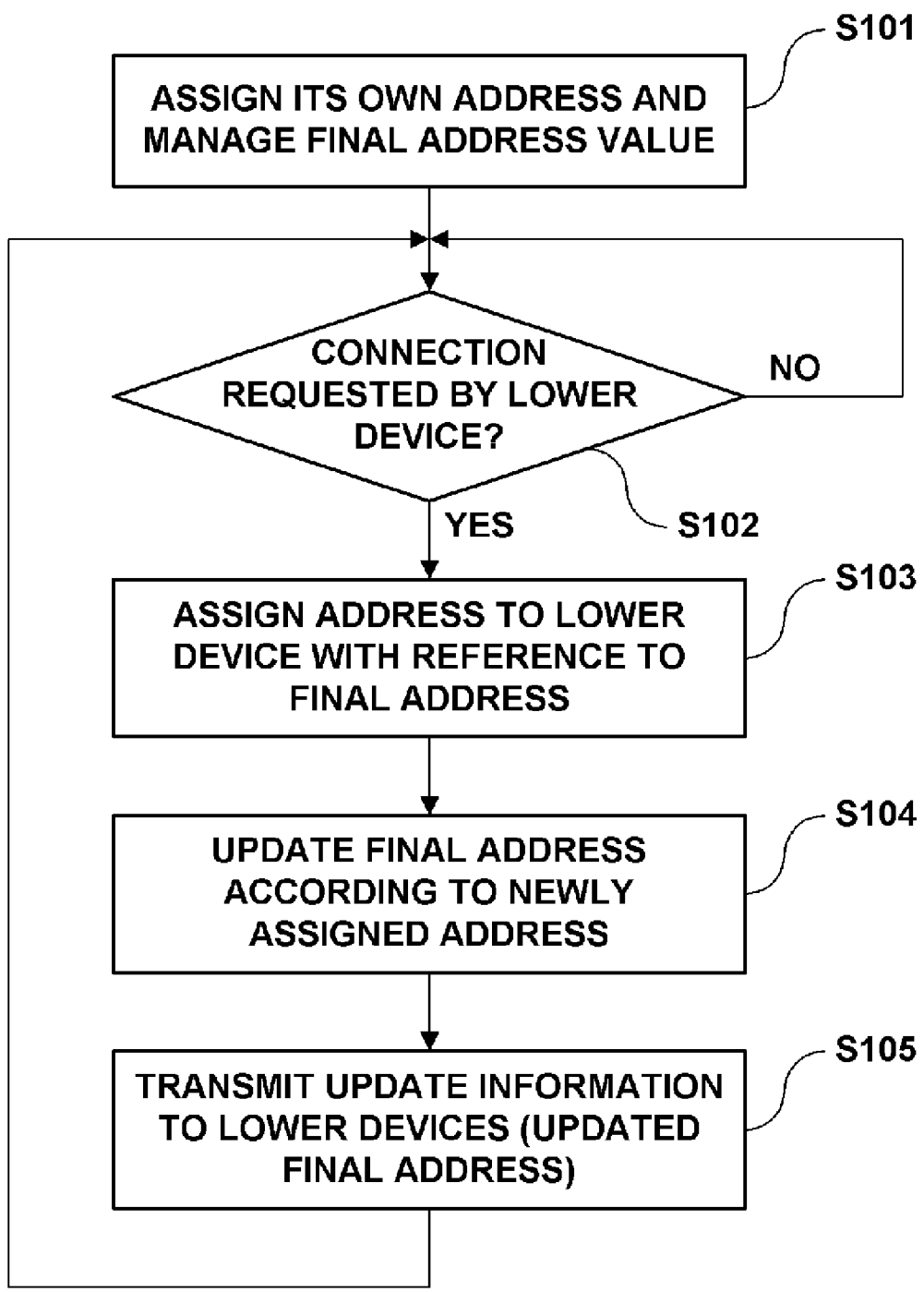

[Fig. 13]
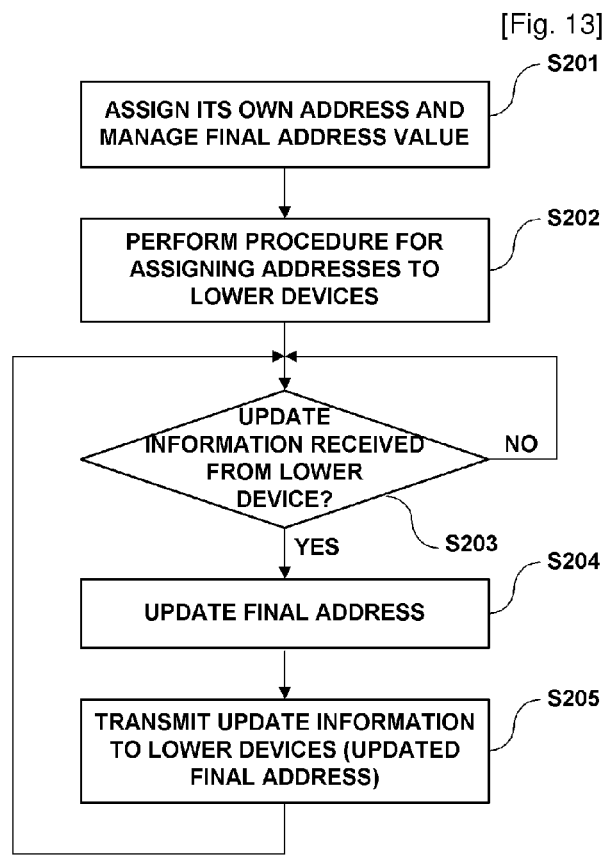
[Fig. 14]
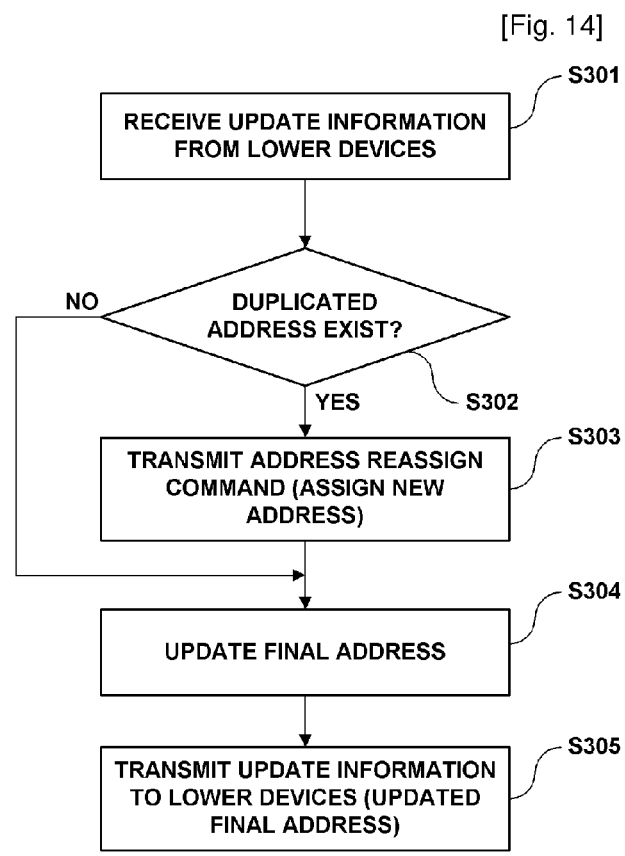

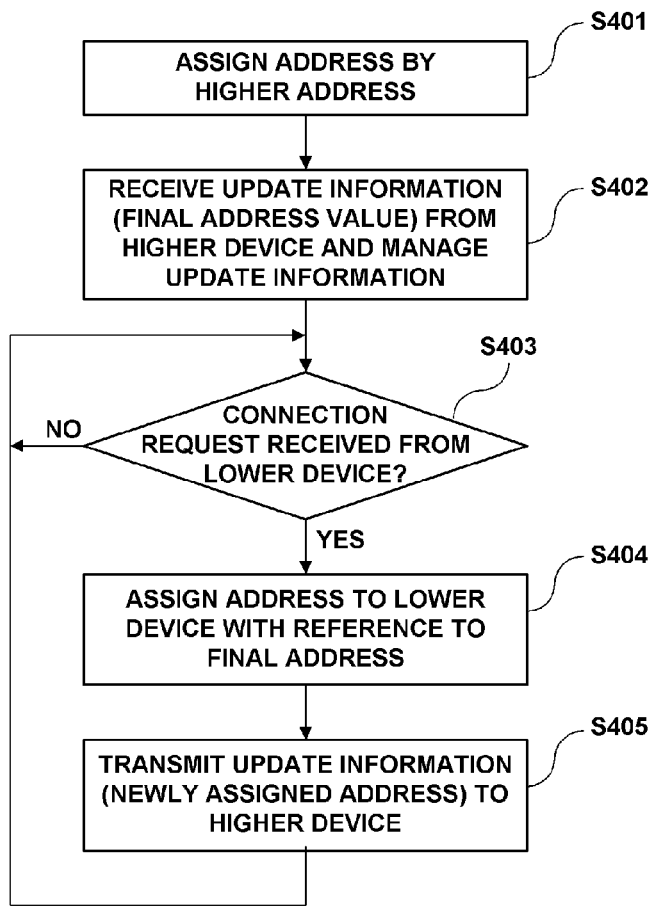
[Fig. 15]
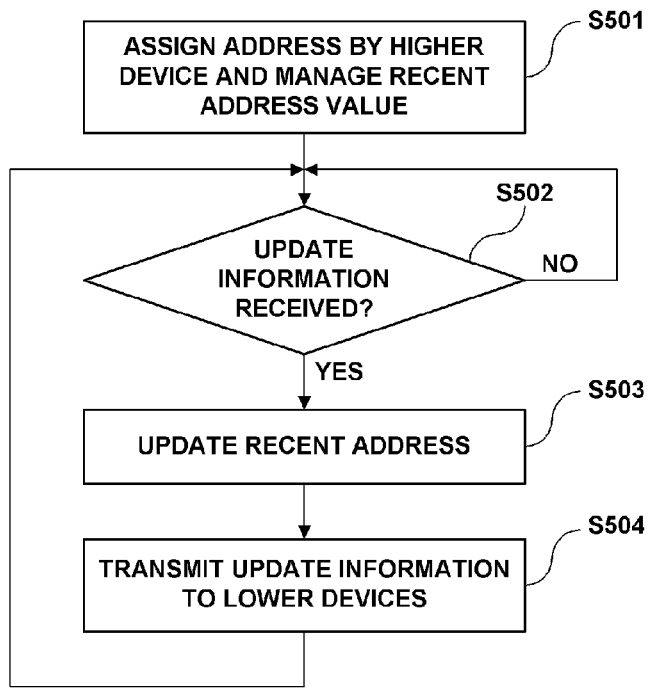
[Fig. 16]

[Fig. 17]
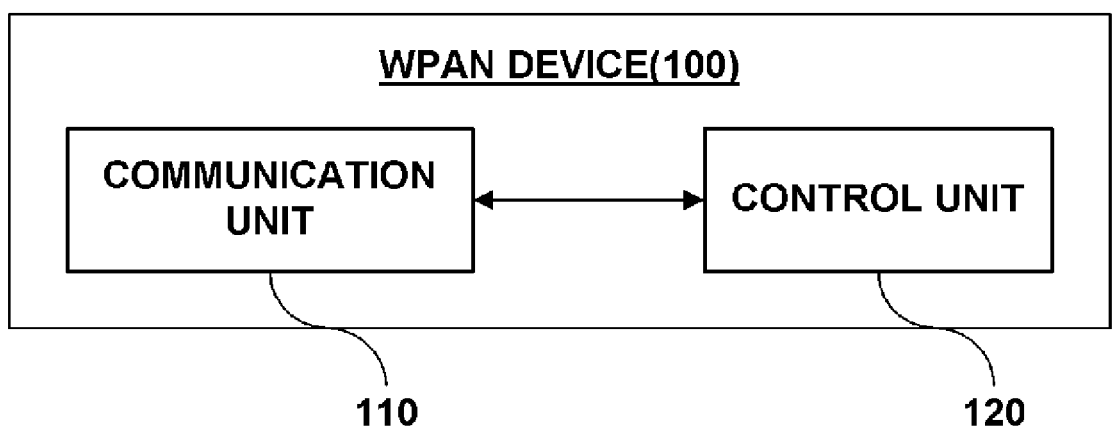

METHOD FOR ALLOCATING AN ADDRESS OF DEVICE IN WIRELESS PERSONAL AREA NETWORK (WPAN) AND WPAN DEVICE

TECHNICAL FIELD

The present invention relates, in general, to a method of efficiently assigning addresses in a Wireless Personal Area Network (WPAN) and to a WPAN device, and, more particularly, to a method of efficiently assigning addresses in a WPAN and to a WPAN device, which can efficiently distribute the logical address values of respective devices in a WPAN environment and can assign address values on the basis of the final address value without imposing restrictions on service models, thus realizing scalability and flexibility.

BACKGROUND ART

Generally, Wireless Personal Area Network (hereinafter referred to as 'WPAN') technology is one of the core technologies for ubiquitous networks in which persons, computers and objects are connected to each other through a single structure. A representative example of the application of WPAN technology is a sensor network, which functions to combine an existing sensor network environment with an actual physical environment.

A sensor network occupies an important role in realizing the ubiquitous generation. In particular, when ubiquitous networking is implemented in the home, it will provide a large incentive to construct national-level infrastructure, and thus the construction of a ubiquitous networking environment in the home is very significant. Further, home networking technology, which is one of the ubiquitous networking technologies, has emerged as a core technology for overcoming the serious situation in which existing markets for electric home appliances are rather depressed, in the ubiquitous generation, and a sensor network is central to such home networking technology.

It is predicted that a sensor network, expected to be composed of several hundreds or thousands of small sensor modules, will be applied to various fields, such as remote monitoring in intelligent home networks, automatic manufacturing process control, the administration of warehouse and physical distribution, remote patient monitoring in hospitals, and security systems for break-in detection.

Meanwhile, a WPAN can be used to implement such technology, and is characterized in that it has advantages, such as a transmission range of less than 10 m, low power consumption, and a size small enough to be mounted in a sensor or the like. Of such WPAN technologies, technology that is currently attracting attention includes ZigBee, which is low-speed and low-power WPAN technology. However, current ZigBee technology is limitedly applicable to networks and suffers from the instability of networks.

FIG. 1 is a diagram showing a transmission interval between beacons transmitted by a single node in ZigBee. A single node has a period during which data is transmitted or received after transmitting a beacon, and then has a sleep period in order to reduce power consumption. The intervals at this time are regularly designated and are equally applied to a next beacon transmission period, a next data transmission/reception period, and a next sleep period. That is, the beacon transmission period, the data transmission/reception period, and the sleep period are repeated at regular intervals.

During the sleep period, the transmission of data is possible, but the reception of data is impossible. The transmission of a beacon is required in order to connect a node below a reference node, so that the last node present in the configuration of a network does not require the transmission of a beacon after a certain period of time has elapsed.

FIG. 2 is a diagram showing the status of the transmission of beacons between two nodes occurring at the time of transmitting beacons between a first node and a second node. The first node transmits a beacon to the second node and transmits a time slot, ranging from the transmission of the beacon to the transmission of the next beacon, to the second node. The second node, having received the time slot, transmits its own beacon in the start section of the period, which is not used by the first node, in order to avoid collisions with the beacon transmitted by the first node.

Meanwhile, one of the main functions of a ZigBee network protocol is to assign logical addresses to construct a cluster tree. The cluster tree is formed in such a way that a ZigBee coordinator is set to the highest root and all nodes present in the ZigBee network are connected to the ZigBee coordinator in a lower tree structure. When the ZigBee network is formed and the tree is constructed, logical addresses that enable respective devices to be distinguished from each other and that allow data transmission routes or the like to be determined are assigned to respective nodes by their parent nodes.

Several terms are described below to describe conventional methods of assigning addresses. First, $C_m$ is the maximum number of child nodes that a parent node can have. That is, this means that a maximum of $C_m$ devices can be connected to a single device. However, the devices defined by $C_m$ cannot be connected to lower devices any more. These devices are designated as 'end devices.'

$L_m$ is the maximum level number or the depth of a tree structure. FIG. 3 illustrates an example of $L_m$. That is, when $L_m$, is 2, the depth of devices to be connected may extend up to two hops, as shown in FIG. 3.

$R_m$ is the number of lower devices connected to a reference node, similar to $C_m$. However, unlike $C_m$, devices defined by $R_m$ have the function of connecting other devices below the lower devices. Such a function is called a coordinator function.

Since the above values $C_m$, $L_m$ and $R_m$ are determined, the infinite extension of sensor network devices can be limited. When a single service model is selected and a sensor network suitable for the service model is implemented, the number of devices suitable for the service model can be limited. That is, the values can be set as identical values for devices belonging to the same WPAN.

Meanwhile, a ZigBee coordinator determines the maximum number of child nodes "$C_m$" that each parent node can have, and the maximum level number or depth of a tree structure "$L_m$" so as to assign logical addresses when a ZigBee network is formed. Each parent node calculates a block size and an address block value (Cskip) on the basis of the values "$C_m$" and "$L_m$," and is assigned a logical address block, which will be used by the child nodes thereof, by the ZigBee coordinator.

The address block value denotes the number of other lower devices that can be connected to a reference device in a number corresponding to the address block value. That is, when an address block value is 0, even a device functioning as a coordinator cannot assign an address value to devices below it any further, which means that no lower device can be connected to the device.

FIG. 4 is a diagram showing an equation for obtaining an address block value Cskip (d), which shows that, for a reference device having a depth of d, the number of lower devices that can be connected to the reference device and that include a lower device having a depth of d+1 can be detected. Further, there is no need to assign an address block to a device functioning as an end device because the end device does not perform the function of connecting a lower device thereto. Therefore, the end device is assigned only a single address to be used by the end device itself.

Through the equation shown in FIG. 5, an address value to be assigned to an end device that is connected in an n-th order can be obtained. Through this method, addresses can be assigned between WPAN devices formed based on a service model. In the equation of FIG. 5, $A_n$ is the address of an end device that is connected in an n-th order among end devices, $A_{parent}$ is the address value of the higher device of a reference parent device desired to be connected, and Cskip (d) is the address block value of the higher device of the reference device desired to be connected.

In order to show an example of an address block assignment method, the configuration of a WPAN is intended to be implemented by assigning addresses to a service model using values such as $C_m$=4, $R_m$=3, and $L_m$=3.

First, the maximum number of devices that can be connected to a reference device must be obtained using the reference device that was generated first. In the case of the reference device that was generated first, the depth thereof is d=0, so that an address block value, as shown in FIG. 6, is obtained using FIG. 4. Through this equation, address block values such as Cskip (1)=5, Cskip (2)=1, and Cskip (3)=0 are obtained. That is, this service model shows that a device having a depth of 1 can be connected to a maximum of five devices having a depth of 2 or more, a device having a depth of 2 can be connected to a single device having a depth of 3, and a device having a depth of 3 functions as an end device that cannot be connected to any more devices.

FIG. 7 is a diagram showing an example of the configuration of a network formed using the above-described embodiment.

In FIG. 7, since the first device has an address block value of Cskip (1)=5, the number of lower devices that are connected thereto, including the second device, cannot exceed 5.

The above-described address assignment method does not seem to have any special problem in the configuration of a network, but, in practice, there are many cases in which a great number of devices may exist in a small space in the case of a sensor network. Accordingly, although the total number of address blocks required for the configuration of the network of FIG. 7 is 17, a node having an address value of 52 exists, as shown in FIG. 7, and thus it can be seen that distribution efficiency is deteriorated.

Further, since address values used in ZigBee technology, which is widely utilized as sensor network technology for wireless personal communication, are 16 bits, addresses can be assigned to a maximum of 65,536 devices in a single WPAN area. However, the existing address assignment method is problematic in that, since the number of devices connected to a reference device is calculated in advance, and the reference device has a number of address blocks corresponding to the calculated number of devices, the reference device unnecessarily wastes its own address blocks if no device is connected to the reference device, even if the reference device has a great number of address blocks.

Further, another coordinator may not permit connection any further when all address blocks assigned thereto are exhausted. That is, balance in address distribution, which allows as many devices to attempt connection as possible in the WPAN area by assigning a large address block to a device to which a large number of devices is connected, is excluded.

Consequently, this interferes with the connection between various sensor devices in a ubiquitous sensor network, and the number of allowable devices is also limited when the above-described values $C_m$, $R_m$, and $L_m$ are designated, thus resulting in a decrease in scalability and efficiency between different devices which do not belong to a designated service model. As a result, the existing method causes a problem of a change in the service model itself, which does not conform to ubiquitous networking, in which various types of service must coexist.

DISCLOSURE OF INVENTION

Technical Problem

Accordingly, the present invention has been made keeping in mind the above problems occurring in the prior art, and an object of the present invention is to provide a method of efficiently assigning addresses in a WPAN and a WPAN device, which can efficiently distribute logical address values of respective devices in a WPAN environment, and can realize scalability and flexibility attributable to the efficient distribution of address values without imposing restrictions on service models.

Another object of the present invention is to provide a method of efficiently assigning addresses in a WPAN and a WPAN device, which manage address values on the basis of a device that is generated first, that is, the highest node, thus improving the scalability and stability of the distribution of addresses to all devices present in a WPAN area.

Technical Solution

In accordance with an aspect of the present invention to accomplish the above objects, there is provided a method of efficiently assigning addresses in a Wireless Personal Area Network (WPAN) supporting a tree structure, the method being performed by a highest device, comprising a first step of managing an address assignment information for determining an address to be assigned; a second step of assigning an address based on the address assignment information to a lower device that requests connection; a third step of updating the address assignment information as the address of the second step is assigned, and transmitting the updated address assignment information to lower devices; and a fourth step of, if an update of the address assignment information is requested by at least one of the lower devices that assigned an address to a device lower thereto, updating the address assignment information, and transmitting the updated address assignment information to the lower devices.

Preferably, the address assignment information managed at the first step is a final value of assigned addresses or an address to be assigned next.

Preferably, the fourth step comprises the step of, if the address assigned by at least one of the lower devices is duplicated, transmitting an address reassign command to reassign the duplicated address to a address value included therein.

In accordance with a further aspect of the present invention to accomplish the above objects, there is provided a method of efficiently assigning addresses of devices in a Wireless Personal Area Network (WPAN) supporting a tree structure, comprising a first step of receivinq an address assigned by a higher device and being connected to the higher device, and managing an address assignment information for determining an address to be assigned to a lower device, which is received from the higher device; a second step of, in response to a connection request from a lower device, assigning an address to the lower device, based on the address assignment information; and a third step of transmitting an update information for the address assignment information, which includes the address assigned at the second step, to the higher device.

Preferably, the address assignment information is a final value of assigned addresses or an address to be assigned next.

Preferably, the method further comprises steps of, after the third step, a fourth step of updating the address assignment information when the updated address information is received from the higher device; and a fifth step of transmitting the updated address assignment information to the lower device.

Preferably, the method further comprises steps of, receiving an address reassign command, which includes a reassigned address, from the higher device; and reassigning the address of the lower device to the reassigned value.

Preferably, the update information of the third step includes a route information for unicast communication.

In accordance with yet another aspect of the present invention to accomplish the above objects, there is provided a Wireless Personal Area Network (WPAN) device, comprising a communication unit for data transmission and reception between devices; and a control unit for; managing an address assignment information for determining an address to be assigned; receiving, through the communication unit, a connection request from a lower device, assigning an address to the lower device, and updating the address assignment information; transmitting, through the communication unit, the updated address assignment information to lower devices; receiving, through the communication unit, an update request of the address assignment information from at least one of the lower devices that assigned an address to a device lower thereto, updating the address assignment information; and transmitting, through the communication unit, the address assignment information, updated in response to the request, to the lower devices.

Preferably, the address assignment information is a final value of assigned addresses or an address to be assigned next.

Preferably, the control unit determines whether the address assigned by at least one of the lower devices is duplicated, and transmits, through the communication unit, an address reassign command to reassign the duplicated address to a address value included therein.

In accordance with still another aspect of the present invention to accomplish the above objects, there is provided a Wireless Personal Area Network (WPAN) device, comprising a communication unit for data transmission and reception between devices; and a control unit for, through the communication unit requesting a connection to a higher device and receiving an address assigned by the higher device managing an address assignment information for determining an address to be assigned to a lower device which is received from the higher device, receiving, through the communication unit, a connection request from a lower device, and assigning an address to the lower device based on the address assignment information; and transmitting, through the communication unit, an update information for the address assignment information, which includes the address assigned to the lower device, to the higher device.

Preferably, the address assignment: information is a final value of assigned addresses or an address to be assigned next.

Preferably, the control unit updates the address assignment information when the updated address information is received from the higher device, and transmits the updated address assignment information through the communication unit to the lower device.

Preferably, the control unit receives an address reassign command, which includes a reassigned address, through the communication unit from the higher device, and reassigns the address of the lower device to the reassigned value.

ADVANTAGEOUS EFFECTS

Accordingly, the method of efficiently assigning addresses in a WPAN according to the present invention is advantageous in that, since the logical address values of respective devices are sequentially distributed according to the connection sequence in a WPAN environment, the address values can be efficiently used, and in that, since collisions between the addresses of respective devices having different service models do not occur, a stable network can be configured.

Further, the present invention is advantageous in that, since address values are assigned without imposing restrictions on service models, a network can extend to a wider area, rather than causing only a number of devices corresponding to the designated number of address blocks to be connected, thus realizing scalability and flexibility.

Further, the present invention is advantageous in that, since address values are managed on the basis of the device that is generated first, that is, the highest device, the efficiency and stability of the assignment of addresses to all devices present in a WPAN area can be improved.

Furthermore, the present invention is advantageous in that, since route setup information is transmitted together when the update information of the final address value is transmitted to a higher device, data can be immediately and stably transmitted without requiring a separate route setup process, performed in the direction from a higher device to a lower device, when a change in information is required.

BRIEF DESCRIPTION OF THE DRAWINGS

FIG. 1 is a diagram showing the transmission interval of beacons transmitted by a single node;

FIG. 2 is a diagram showing the status of the transmission of beacons between two nodes;

FIG. 3 is a diagram showing the depth ($L_m$) of a tree structure;

FIG. 4 is a diagram of an equation for obtaining an address block value;

FIG. 5 is a diagram of an equation for obtaining the address value of an end device;

FIG. 6 is a diagram of an equation for showing an embodiment of an address block value;

FIG. 7 is a diagram showing an example of network configuration implemented using a conventional address assignment method;

FIG. 8 is a network configuration diagram showing a method of efficiently assigning addresses in a WPAN according to the present invention;

FIG. 9 is a diagram showing an embodiment of a processing procedure, performed when the addresses of two nodes are duplicated, in the efficient address assignment method in a WPAN according to the present invention;

FIG. 10 is a diagram showing another embodiment of a processing procedure, performed when the addresses of two nodes are duplicated, in the efficient address assignment method in a WPAN according to the present invention;

FIG. 11 is a diagram showing an embodiment of a processing procedure, performed when the addresses of three nodes are duplicated, in the efficient address assignment method in a WPAN according to the present invention;

FIG. 12 is a flowchart showing the operating procedure of the highest node, performed when the highest node assigns an address to a lower device, in the efficient address assignment method in a WPAN according to an embodiment of the present invention;

FIG. 13 is a flowchart showing the operating procedure of the highest device, performed when a lower device assigns an address, in the efficient address assignment method in a WPAN according to another embodiment of the present invention;

FIG. 14 is a flowchart showing the operating procedure of the highest device, performed when addresses are duplicated due to the assignment of an address by a lower device, in the efficient address assignment method in a WPAN according to an embodiment of the present invention;

FIG. 15 is a flowchart showing the operating procedure of a lower device for transmitting update information to a higher device in the efficient address assignment method in a WPAN according to an embodiment of the present invention;

FIG. 16 is a flowchart showing the operating procedure of a lower device, performed when update information is received from a higher device, in the efficient address assignment method in a WPAN according to an embodiment of the present invention; and FIG. 17 is a diagram showing the construction of a WPAN device according to an embodiment of the present invention.

BEST MODE FOR CARRYING OUT THE INVENTION

The above objects, technical construction, operation, and advantages of the present invention will be more clearly understood from the following detailed description, taken in conjunction with the accompanying drawings.

FIG. 8 is a network configuration diagram showing a method of efficiently assigning addresses in a Wireless Personal Area Network (WPAN) according to the present invention.

The address assignment method according to the present invention is performed to assign sequential address values to devices ranging from an initial device, which is the highest node, to lower devices connected thereto in order to assign address values without wasting address values at the time of assigning addresses to devices generated in the network.

For this purpose, a WPAN device according to the present invention manages the final address value that was previously assigned, or the address value that is to be assigned next, as address assignment information. Further, in order to allow each device to manage address assignment information, update information and address assignment information are transmitted or received between higher devices and lower devices.

The operation of the present invention is described below with reference to the network environment of FIG. 8.

In this embodiment, for convenience of description, a description will be made on the assumption that device A, which is the highest node (initial device), has an address value of 1, and devices subsequently connected to device A are assigned address values increasing in increments of 1.

First, an inter-device discovery procedure for allowing device A to search for lower devices that are connected thereto, and allowing devices B, C and D to discover device A through the search and to request connection from device A is performed.

Since device A is generated first, it responds to the request so as to connect devices B, C, and D thereto as lower devices. Device A personally assigns addresses to devices B, C and D in the sequence of devices B, C and D on the basis of the sequential address assignment method according to the present invention. When the address value of device A is 1, and the address value sequentially increases by 1, the address value of device B is 2, the address value of device C is 3, and the address value of device D is 4.

In this case, as device A assigns address values to lower devices, device A updates the final address value managed thereby. The final address value is transmitted with the final address value carried in a beacon payload, and is increased by 1 whenever addresses are assigned to the devices.

For example, when device A initially transmits a beacon to device B, the final address value related to the assignment of an address is 1, but increases by 1 whenever device A assigns an address to device B, C, or D through the connection to device B, C or D. Therefore, device A, generated first, personally assigns addresses to devices that request connection from device A, increases the final address value of the beacon payload by 1 whenever each address is assigned, and obtains a final address value of 4 after connection up to device D is completed. In this state, devices A, B, C, and D set the same final address value of 4 in their beacon payloads, and then transmit the beacons.

Further, in the present invention, a higher device assigns an address value to a lower device. At this time, since address values are assigned on the basis of the final address value, respective devices must update the final address value in real time. Therefore, when the final address value of device A, which is the initial device, is updated in the present invention, device A transmits update information, including its updated final address value, to devices lower thereto. Here, the transmission of update information means that the final address value of the beacon payload is updated, and the beacon is transmitted.

Meanwhile, when device E discovers device B through a search and requests connection from device B after connection to devices B, C and D is completed, device B checks that address values up to 4 have been assigned through the final address value existing in its beacon payload, assigns an address value of 5 to device E, and transmits update information, including information about the address value assigned by device B itself, that is, final address value information, to device A, which is the device higher to device B.

The update information transmitted by device B, which is a lower device, to device A, which is the highest device, is an update command. The highest device changes the final address value managed thereby on the basis of the received update information, and transmits the changed final address value to the lower devices.

That is, after receiving update information from device B, device A changes the final address value information existing in its beacon payload, and transmits the beacon, thus enabling update information to be transmitted to other devices. Accordingly, devices C and D check update information through the beacon transmitted by device A, change the final address values existing in their beacon payloads, and then transmit beacons.

In this case, when device F is powered on, device F perceives the beacons of devices B and E through the search. Since device B is placed at a higher level than device F, device F requests connection from device B. Device B also assigns an address to device F on the basis of the final address value information of its beacon payload. Since the final address value is updated to 5, an address value of 6 is assigned to device F.

Further, after assigning the address to device F, device B transmits update information to device A, sets newly updated final address value information in its beacon payload, and transmits the beacon to lower devices during the beacon transmission period of device B. Device A receives update information from device B, and transmits the newly updated final address value information during the information transmission period (beacon transmission time) thereof. Accordingly, other devices, such as devices C and D, perceive the information (beacon) received from device A, and update their final address values.

To date, the address values are assigned up to device F, and the final address value is 6. Next, when device H is powered on, searches the surrounding devices, discovers device D through the search, and requests connection from device D, device D assigns an address value of 7 to device H because the final address value of device D at that time is 6.

Further, device D allows device A to update the final address value by transmitting update information to device A. Device A, having received the update information from device D, updates its final address value to 7, and transmits the beacon during the transmission period thereof.

Devices B and C, having received the beacon from device A, update their final address values and transmit their beacons. Devices E and F also perceive the beacon received from device B, and update their final address values. Through this procedure, the final address values of all devices, currently operating in the network, become 7.

Device I, subsequently joining the network, is assigned an address value of 8 by device D as the address value of device I based on the final address value, using the same method. The final address values of all of the devices are updated to 8 through the transmission or reception of update information.

Meanwhile, when the address assignment method, as described above, with reference to FIG. 8 is used, there may occur the case where addresses are duplicated due to the characteristics of the network when devices are simultaneously powered on and simultaneously request connection. The solution to this problem will be described below with reference to FIGS. 9 to 11.

FIGS. 9 and 10 are diagrams showing the embodiments of a processing procedure performed when the addresses of two nodes are duplicated, and FIG. 11 is a diagram showing an embodiment of a processing procedure performed when the addresses of three nodes are duplicated.

First, the cases where duplication occurs may include the case where, as shown in FIG. 9, devices E and I almost simultaneously request connection from devices B and D after devices B, C and D have been assigned address values by device A.

In this case, since the final address values of devices B and D are 4, devices B and D assign an address of 5 to devices E and I, respectively, and thereafter transmit update information to device A. At this time, devices E and I have duplicated addresses.

Since device A, which is an initial device, has an address table related to the assignment of addresses, device A compares the address value newly assigned to a device with the final address value included in the entire information, on the basis of the update information. Therefore, in the above case, device A is aware that devices B and D assigned the same address value to devices E and I at the moment that device A receives update information from devices B and D.

At this time, device A selects one of devices B and D and transmits an address reassign command directing the selected device to reassign an address to the selected device. In the case where device A transmits the address reassign command to device D, device D solves the problem by assigning an address value of 6, which is a new address assigned to device I by device A.

In this case, since device A is aware that the final address value is 5, it can transmit an address assignment command directing an address value of 6 to be assigned. Since device A changes the final address value of its beacon payload to 5 on the basis of the update information received from devices B and D, and transmits the beacon, device D can perceive the beacon received from device A and determine the address value to be newly assigned.

Meanwhile, when update information is transmitted from a lower device to a higher device, it is preferable to configure data by carrying route information in the address update information and to transmit the configured data in order to easily find a network communication route. Accordingly, the initial device can transmit reassign command data to a device, requiring the reassignment of an address, in a unicast communication manner with reference to the update information. When the reassign command data is used, a separate route setup procedure or the like can be omitted for network communication, thus guaranteeing an increase in communication speed and communication flexibility.

FIG. 10 illustrates a procedure for solving the duplication of the addresses of devices X and Y in the case where devices X and Y almost simultaneously request connection from devices E and I, respectively, and devices E and I assign the same address value of 7 to devices X and Y with reference to the final address values existing in their own information after addresses have been assigned up to device I.

Devices E and I assign an address value of 7 to devices X and Y with reference to the final address values existing in their own information. Thereafter, device E transmits update information, including an address value of 7, to device B, and device B, having received this update information, transmits update information to device A.

Further, device I transmits update information to device A using the same method, and device A is aware that devices E and I have assigned the duplicated address after individually receiving update information from devices E and I.

At this time, device A selects one of devices E and I (in this case, it is assumed that device I is selected), and then stably transmits an address reassign command, directing device I to assign an address value of 8, to device I with reference to the route setup data included in the update information. Accordingly, device I receives the address reassign command, and changes the address value of device Y to 8.

Meanwhile, device A receives update information from devices E and I, and is aware that a total of 8 address values are used up to that point, and thus changes the final address value of its own beacon payload to 8.

FIG. 11 is a diagram showing a procedure for solving the duplication of addresses in the case where devices E, G and I almost simultaneously request connection from devices B, C and D, respectively, after addresses have been assigned up to device D.

Devices B, C and D assign an address value of 5 to devices E, G and I on the basis of their own final address value information. Thereafter, devices B, C and D transmit update information to device A. Device A receives this information, and is then aware that devices E, G and I are using the duplicated address value.

Therefore, device A arbitrarily selects two from among devices B, C and D, and transmits address assign commands, directing address values to be changed, to the selected devices (in this case, it is assumed that the address assign commands are transmitted to devices C and D). Respective address reassign commands include information about the address values of 6 and 7, and device A updates the final address value to 7.

Devices C and D, having received the address reassign commands, change the addresses, assigned to devices G and I, to new address values of 6 and 7. Accordingly, respective devices are given unique addresses while avoiding the duplication of address values.

Next, the operating procedures of respective devices based on the address assignment method according to the present invention are summarized and described with reference to FIGS. 12 to 16.

FIG. 12 is a flowchart showing the operating procedure of the highest node, performed when the highest device assigns an address to a lower device, in the method of efficiently assigning addresses in a WPAN according to an embodiment of the present invention.

As shown in the drawing, the highest device, which is an initially generated device, assigns its address value, and must manage the address value as the final address value at step S101.

Next, when connection is requested by the lower device through an inter-device discovery procedure at step S102, the highest device assigns an address to the corresponding lower device on the basis of the final address value at step S103. In the present invention, address values are sequentially assigned in the connection sequence of a tree structure, and are preferably assigned as values obtained by sequentially adding 1 to the address value of the highest device.

Meanwhile, in the present invention, the node that assigned an address value must perform an update procedure for updating the final address value. Therefore, the highest device updates the final address value according to a newly assigned address value at step S104.

Further, since the highest device can be connected to a plurality of lower devices, the highest device of the present invention transmits update information including currently updated final address value information to the lower devices when the final address value has been updated as an address is assigned to a specific lower device at step S105.

At this time, the lower device, to which the address has been assigned, can manage its final address value as its own address value when the address is assigned. Accordingly, the highest device can transmit update information only to lower devices other than the device that causes the highest device to perform an update, that is, the lower device to which the address is currently assigned, among the lower devices. When only a device that assigned an address value is implemented to be able to manage the final address value, the highest device needs to transmit update information to all lower devices.

Next, FIG. 13 is a flowchart showing the operating procedure of the highest device, performed when a lower device assigns an address, in the efficient address assignment method in a WPAN according to an embodiment of the present invention.

As shown in the drawing, the highest device, which is an initially generated device, assigns its address value, and manages the address value as the final address value at step S201, and performs a procedure for assigning an address in response to a connection request received from lower devices according to the procedure shown in FIG. 2 at step S202.

Meanwhile, the device that assigned an address value must perform an update procedure in the present invention, and the assignment of an address value is performed not only by the highest device, but also by all higher devices to which lower devices are connected. Accordingly, the update of the final address value of the highest device can be performed through the reception of update information from the lower devices.

That is, when a lower device, connected to the highest device, assigns an address to a device lower thereto, and the highest device receives update information from the lower device that assigned the address at step S203, the highest device updates its final address value at step S204, and transmits update information, including the updated final address value, to the lower devices at step S205.

The lower device that transmitted the update information to the highest device can personally update its final address value after assigning the address to a device lower thereto. Accordingly, the highest device may transmit update information only to lower devices, other than the device causing the highest device to perform an update, that is, the lower device, which currently transmits the update information to the highest device, among the lower devices.

However, in this case, the lower device, which causes the update to be performed, must personally transmit update information to devices lower thereto, and erroneous update may be performed when the duplication of addresses occurs. Accordingly, from the standpoint of efficiency, it is preferable that update information transmitted from the lower device be unconditionally uploaded to the highest device, and, thereafter, all lower devices change their final address values through the transmission of the final address value by the highest device.

FIG. 14 is a flowchart showing the operating procedure of the highest device, performed when addresses are duplicated due to the assignment of an address by a lower device, in the efficient address assignment method in a WPAN according to an embodiment of the present invention.

As shown in the drawing, when the highest device receives update information from a plurality of lower devices at step S301, the highest device can determine whether address values, assigned by the plurality of lower devices to devices lower thereto, are identical to each other.

That is, when the number of devices, to which address values are assigned up to that point, is 8, and the final address value included in update information received from the lower devices is 7, the highest device recognizes that the same address value has been assigned to two devices.

Therefore, when the highest device recognizes that a duplicated address exists at step S302, the highest device selects any one of the two lower devices that assigned the same address value, and transmits an address reassign command to the selected lower device, with an address value, which is to be assigned, included in the address reassign command, at step S303.

Accordingly, the lower device, having received the address reassign command, assigns an address value again to a device lower thereto using the address value included in the address reassign command, thus preventing collisions between addresses.

Further, the highest device updates the final address value according to the address value information, which is included in the address reassign command and is transmitted, at step S304. As the final address value is updated, the highest device transmits update information, including the updated final address value, to devices lower thereto at step S305.

FIG. 15 is a flowchart showing the operating procedure of a lower device for transmitting update information to a higher device in the efficient address assignment method in a WPAN according to an embodiment of the present invention.

As shown in the drawing, a lower device, which has been assigned an address value by a higher device at step S401, continuously receives update information, including the final address value, from the higher device as address values are assigned to devices present in a WPAN area, and thus manages the final address value information at step S402.

Next, when the lower device, which manages the final address value information as described above, receives a connection request from a device lower thereto at step S403, the lower device having received the connection request assigns an address value to the connection-requesting lower device on the basis of the final address value at step S404. That is, when the final address value is 2, the lower device assigns an address value of 3.

Further, as described above, the lower device that assigned the address value must perform an update procedure. For this purpose, the lower device that assigned the address value transmits update information to a device higher thereto at step S405. In this case, the update information includes information about a currently assigned address value.

Further, when update information is transmitted from the lower device to the higher device, as in the present case, the lower device preferably transmits update information with route setup information included in the update information.

Meanwhile, in the case where the higher device is the highest device, the higher device updates the final address value on the basis of update information when the update information is received, and transmits the update information to lower devices. In contrast, when the higher device is not the highest device, the higher device transmits the update information up to the highest device, thus enabling the highest device to update the final address value information.

Finally, FIG. 16 is a flowchart showing the operating procedure of a lower device, performed when update information is received from a higher device, in the efficient address assignment method in a WPAN according to an embodiment of the present invention.

As shown in the drawing, the lower device, to which an address value is assigned by the higher device, continuously receives update information, including the final address value, from the higher device as address values are assigned to devices present in the WPAN area, and thus manages final address value information at step S501.

Thereafter, when update information is received from the higher device at step S502, the lower device updates the final address value managed thereby to the final address value included in the update information, and stores the updated final address value at step S503. When there are additional lower devices connected to the higher device, the higher device also transmits update information to the lower devices at step S504, thus enabling all devices to update and manage the final address value in real time.

Meanwhile, in the above embodiment, the case where the finally assigned address value, that is, the final address value, is managed as the address assignment information managed by each device has been described, but the address assignment information of the present invention may be the final address value or an address value to be assigned next.

That is, in order to assign an address value next to the final address value to a new device that requests connection, each device may manage the final address value which was previously assigned, or the address value which is to be assigned next.

The address assignment method of the present invention is applied to a WPAN device for performing the transmission or reception of beacons and data over a WPAN supporting a tree structure.

As shown in FIG. 17, a WPAN device 100, to which the address assignment method of the present invention is applied, may include a communication unit 110 for performing the transmission or reception of beacons and data between devices over a WPAN supporting a tree structure, and a control unit 120 for controlling and processing the entire operation related to the assignment of addresses so as to support the connection between devices. That is, the control unit 120 functions to perform the above-described address assignment method of the present invention, and will be summarized below.

First, the control unit 120 manages address assignment information, required in order to determine an address value to be assigned to a lower device. As described above, the address assignment information may be the final address value that was previously assigned, or the address value that is to be assigned next.

When the WPAN device is the highest device, the control unit 120 assigns an address value to a lower device, requesting connection, through the communication unit 110 with reference to the address assignment information, updates the address assignment information to the next address value, and transmits the updated address assignment information to lower devices.

When the WPAN device is not the highest device, the control unit 120 assigns an address value to a lower device, and transmits address assignment information (update information) to the highest device, thus enabling the address assignment information to be transmitted to all lower devices present in the network through the highest device.

Further, when the WPAN device is the highest device, when the update of address assignment information is requested by the lower device that assigned the address value, the control unit 120 updates the address assignment information to the next address value, and transmits the updated address assignment information to devices lower thereto through the communication unit 110. When the WPAN device is not the highest device, the control unit 120 can transmit an address assignment information update request received from a lower device to the highest device, can update its address assignment information to the address assignment information received from a higher device, or can transmit its address assignment information to a lower device.

Meanwhile, when a plurality of devices assigns the same address value to devices lower thereto, the control unit 120 may receive an address assignment information update request including the same address value information. Therefore, the control unit 120 determines whether the plurality of lower devices has assigned the same address value when the address assignment information update request is received from the lower devices that assigned the address value. If it is determined that the plurality of lower devices has assigned the same address value, the control unit 120 transmits an address reassign command to direct the lower devices to sequentially assign address values, thus preventing the same address value from being assigned to a plurality of devices.

In this case, the control unit 120 causes the address reassign command to be transmitted to the lower devices, except for any one device, that assigned the same address value. Further, in each of the lower devices having received the address reassign command, the control unit 120 performs an operation of reassigning an address value on the basis of the address value included in the address reassign command, or the updated final address value.

Meanwhile, when the final address value is received from the higher device or the lower device, the control unit 120 can update the final address value, managed thereby, to the received final address value.

Since those skilled in the art can implement the present invention in other preferred embodiments without changing the technical spirit or essential features thereof, it should be understood that the above-described embodiments are not intended to limit the present invention, and are intended to exemplify the present invention in all aspects. The scope of the present invention is defined by the accompanying claims rather than the above detailed description, and the meaning and scope of the claims and all changes or modifications derived from equivalents thereof should be interpreted as being included within the scope of the present invention.

INDUSTRIAL APPLICABILITY

As described above, the present invention can be applied to a WPAN device, which assigns an address value to a lower device, requesting connection, in a WPAN supporting a tree structure, efficiently distributes logical address values of respective devices in a WPAN environment, and assigns address values on the basis of the final address value without imposing restrictions on service models, and thus the present invention can be utilized to realize scalability and flexibility.

The invention claimed is:

1. A method of efficiently assigning addresses in a Wireless Personal Area Network (WPAN) supporting a tree structure, the method being performed by a highest device, comprising:
   a first step of managing an address assignment information, for determining an address to be assigned;
   a second step of assigning an address based on the address assignment information to a lower device that requests connection;
   a third step of updating the address assignment information as the address of the second step is assigned, and transmitting the updated address assignment information to lower devices; and
   a fourth step of, if an update of the address assignment information is requested by at least one of the lower devices that assigned an address to a device lower thereto, updating the address assignment information, and transmitting the updated address assignment information to the lower devices.

2. The method according to claim 1, wherein the address assignment information managed at the first step is a final address value of assigned addresses or an address to be assigned next.

3. The method according to claim 1, wherein the fourth step comprises the step of, if the address assigned by at least one of the lower devices is duplicated, transmitting an address reassign command to reassign the duplicated address to an address value included therein.

4. The method according to claim 1, wherein the address assignment information is a final value of assigned addresses or an address to be assigned next.

5. A method of efficiently assigning addresses of devices in a Wireless Personal Area Network (WPAN) supporting a tree structure, comprising:
   a first step of receiving an address assigned by a higher device and being connected to the higher device, and managing an address assignment information for determining an address to be assigned to a lower device, which is received from the higher device;
   a second step of, in response to a connection request from a lower device, assigning an address to the lower device, based on the address assignment information; and
   a third step of transmitting an update information for the address assignment information, which includes the address assigned at the second step, to the higher device.

6. The method according to claim 5, further comprising, after the third step, a fourth step of updating the address assignment information when the updated address information is received from the higher device; and a fifth step of transmitting the updated address assignment information to the lower device.

7. The method according to claim 5, further comprising steps of:
   receiving an address reassign command, which includes a reassigned address, from the higher device; and
   reassigning the address of the lower device to the reassigned value.

8. The method according to claim 5, wherein, the update information of the third step includes a route information for unicast communication.

9. A Wireless Personal Area Network (WPAN) device, comprising:
   a communication unit for data transmission and reception between devices; and
   a control unit for managing an address assignment information for determining an address to be assigned
   receiving, through the communication unit, a connection request from a lower device, assigning an address to the lower device, and updating the address assignment information,
   transmitting, through the communication unit, the updated address assignment information to lower devices,
   receiving, through the communication unit, an update request of the address assignment information from at least one of the lower devices that assigned an address to a device lower thereto, updating the address assignment information; and
   transmitting, through the communication unit, the address assignment information, updated in response to the request, to the lower devices.

10. The WPAN device according to claim 9, wherein address assignment information is a final value of assigned addresses or an address to be assigned next.

11. The WPAN device according to claim 9, wherein the control unit determines whether the address assigned by at least one of the lower devices is duplicated, and transmits, through the communication unit, an address reassign command to reassign the duplicated address to an address value included therein.

12. A Wireless Personal Area Network (WPAN) device, comprising:
   a communication unit for data transmission and reception between devices; and
   a control unit for
   through the communication unit, requesting a connection to a higher device and receiving an address assigned by the higher device,
   managing an address assignment information for determining an address to be assigned to a lower device, which is received from the higher device,
   receiving, through the communication unit, a connection request from a lower device, and assigning an address to the lower device, based on the address assignment information, and
   transmitting, through the communication unit, an update information for the address assignment information, which includes the address assigned to the lower device, to the higher device.

13. The WPAN device according to claim 12, wherein the address assignment information is a final value of assigned addresses or an address to be assigned next.

14. The WPAN device according to claim 12, wherein the control unit updates the address assignment information when the updated address information is received from the higher device, and transmits the updated address assignment information through the communication unit to the lower device.

15. The WPAN device according to claim 12, wherein the control unit receives an address reassign command, which includes an reassigned address, through the communication unit from the higher device, and reassigns the address of the lower device to the reassigned value.

* * * * *